(12) United States Patent
Luong et al.

(10) Patent No.: US 8,103,754 B1
(45) Date of Patent: Jan. 24, 2012

(54) RESERVING A SHARED VOLUME IN A MULTIPLE NODE DATA STORAGE SYSTEM

(75) Inventors: Hoa V. Luong, Fremont, CA (US); Sushil Thomas, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2087 days.

(21) Appl. No.: 10/138,990

(22) Filed: May 2, 2002

(51) Int. Cl.
*G06F 15/16* (2006.01)
*G06F 16/173* (2006.01)

(52) U.S. Cl. .................................. 709/223; 709/225

(58) Field of Classification Search .......... 709/223–226, 709/203, 204–207, 210–219; 711/147, 152, 711/153
See application file for complete search history.

(56) References Cited

U.S. PATENT DOCUMENTS

| | | | | |
|---|---|---|---|---|
| 5,239,650 A | * | 8/1993 | Hartung et al. ............... | 710/8 |
| 5,606,689 A | * | 2/1997 | Nakagawa ................... | 707/206 |
| 5,909,547 A | * | 6/1999 | Mitra ............................ | 709/213 |
| 5,987,550 A | * | 11/1999 | Shagam ....................... | 710/119 |
| 6,272,605 B1 | * | 8/2001 | Le et al. ....................... | 711/151 |
| 6,421,711 B1 | * | 7/2002 | Blumenau et al. ............ | 709/213 |
| 6,516,342 B1 | * | 2/2003 | Feldman et al. .............. | 709/216 |
| 6,574,716 B2 | * | 6/2003 | Dovi ............................. | 711/147 |
| 6,697,846 B1 | * | 2/2004 | Soltis ........................... | 709/217 |
| 6,718,372 B1 | * | 4/2004 | Bober ........................... | 709/217 |
| 6,766,348 B1 | * | 7/2004 | Combs et al. ................. | 718/104 |
| 6,804,766 B1 | * | 10/2004 | Noel et al. .................... | 711/203 |
| 6,952,722 B1 | * | 10/2005 | Podila et al. .................. | 709/213 |
| 7,120,757 B2 | * | 10/2006 | Tsuge .......................... | 711/147 |
| 7,139,809 B2 | * | 11/2006 | Husain et al. ................. | 709/213 |
| 2002/0049825 A1 | * | 4/2002 | Jewett et al. .................. | 709/215 |
| 2002/0065916 A1 | * | 5/2002 | Ooe et al. ..................... | 709/225 |
| 2003/0037178 A1 | * | 2/2003 | Vessey et al. ................. | 709/319 |

* cited by examiner

*Primary Examiner* — Asad M Nawaz
*Assistant Examiner* — Sargon Nano

(57) ABSTRACT

A method for reserving a shared volume in a multiple node data storage system is disclosed. The method ensures that only one host at a time has access to the shared volume. As a result, the data/information stored in the shared volume cannot become corrupted due to multiple hosts accessing the shared volume at the same time through different nodes.

16 Claims, 4 Drawing Sheets

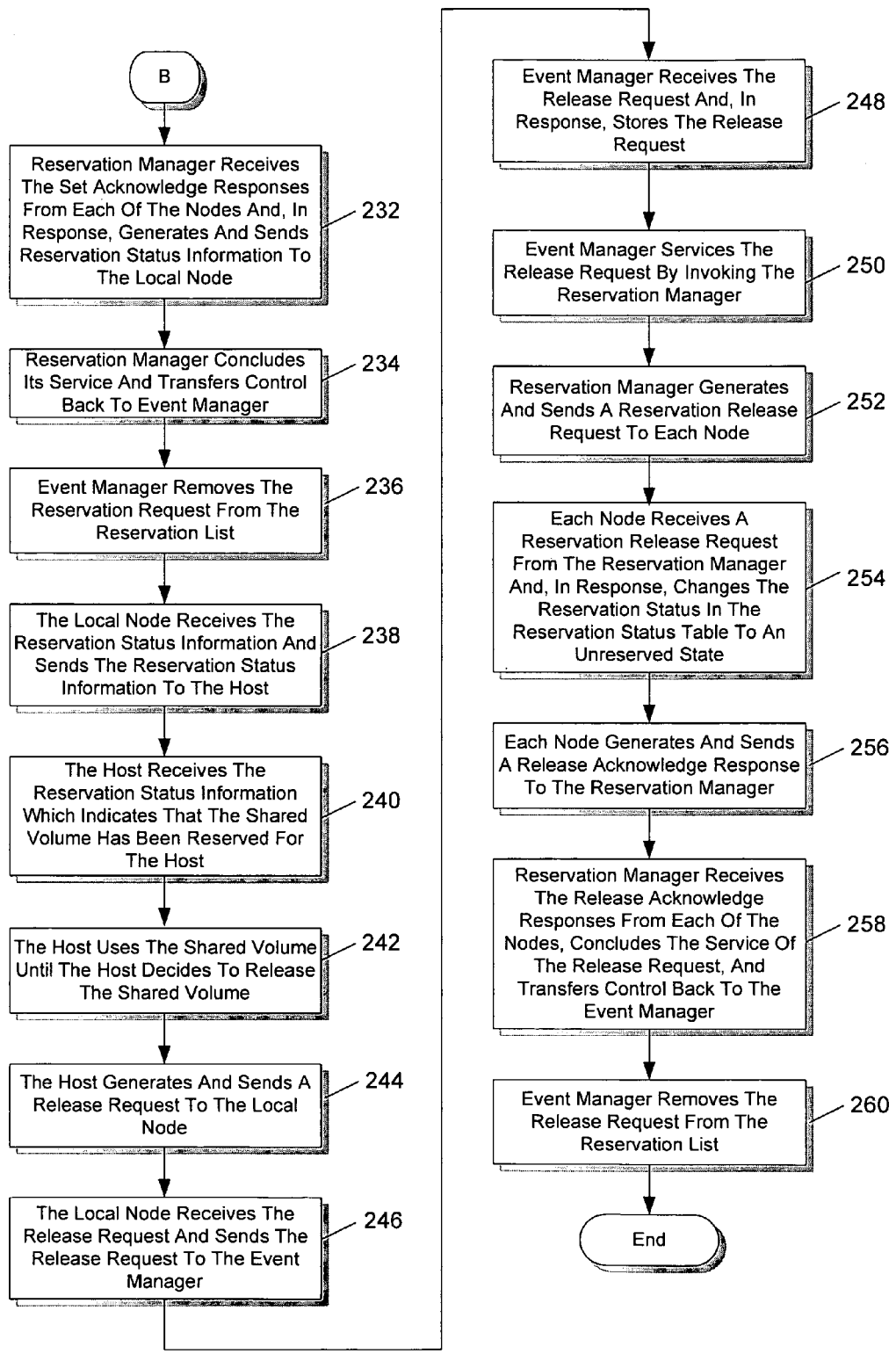

RESERVING A SHARED VOLUME IN A MULTIPLE NODE DATA STORAGE SYSTEM

BACKGROUND

1. Field of the Invention

The present invention relates to electronic data storage systems and, more particularly, to reserving a shared volume in a multiple node data storage system.

2. Related Art

Several different electronic data storage systems have been developed. Two such systems are known as single node data storage systems and multiple node data storage systems.

In a single node data storage system, multiple hosts access a shared volume via a single node. As used herein, a shared volume, which may also be referred to as a virtual volume, is a virtual storage space that stores data/information. A shared volume can physically exist, for example, as a single disk partition or multiple partitions on one or more physical disk drives. In a single node data storage system, the hosts access the shared volume one at a time via the single node. The single node regulates access to the shared volume and only allows one host at a time to access the shared volume. It is important that the hosts access the shared volume one at a time since simultaneous use of the shared volume by more than one host can corrupt the data/information stored in the shared volume.

In a multiple node data storage system, multiple hosts access a shared volume via multiple nodes. The shared volume stores data/information that is common to and used by the multiple hosts. As mentioned above, it very important that the hosts use the shared volume one at a time since simultaneous use by more than one host can corrupt the data/information stored in the shared volume. However, in multiple node systems, different hosts can access the shared volume via different nodes. As a result, multiple hosts may simultaneously use the shared volume, which results in the corruption of the data/information stored in the shared volume.

SUMMARY

The present invention eliminates or substantially reduces the problems described above for previously developed storage systems and techniques. In some embodiments of the present invention, a system and method are provided for reserving a shared volume in a multiple node data storage system which ensures that only one host at a time uses the shared volume. As a result, the data/information stored in the shared volume cannot become corrupted due to multiple hosts using the shared volume at the same time via different nodes.

Certain embodiments, aspects, and advantages of the present invention will become apparent from the following descriptions and the accompanying drawings.

BRIEF DESCRIPTION OF THE DRAWINGS

For a more complete understanding of the present invention and for further embodiments, aspects, and advantages, reference is now made to the following description taken in conjunction with the accompanying drawings in which:

FIGS. 2A-2C are a flow chart of an exemplary method for reserving a shared volume, according to some embodiments of the present invention.

DETAILED DESCRIPTION

Figure 1:
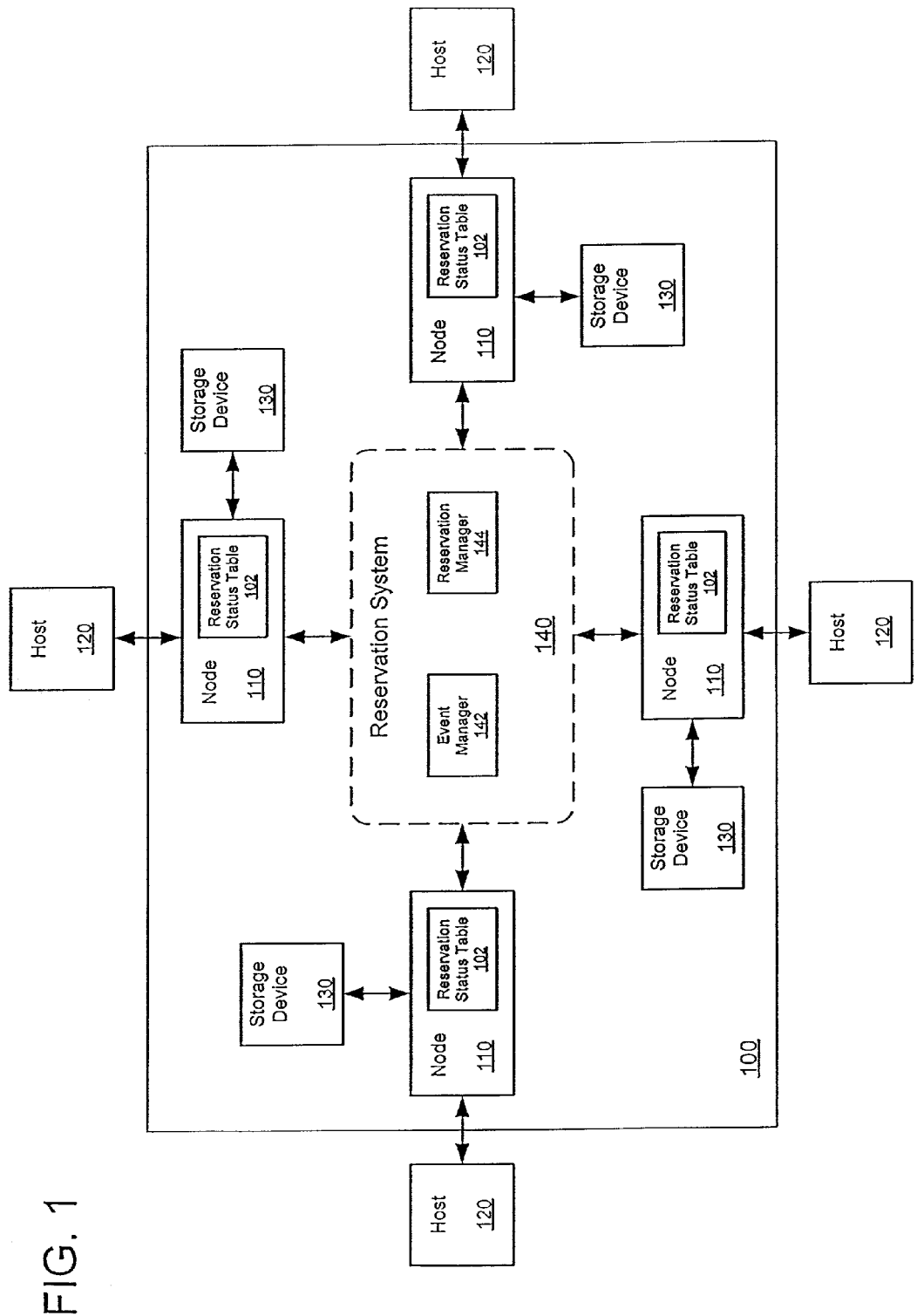
FIG. 1 is a block diagram of a data storage system, according to some embodiments of the present invention.

The preferred embodiments of the present invention and their advantages are best understood by referring to FIGS. 1, 2A, 2B, and 2C of the drawings. Like reference numerals are used for like and corresponding components of the various drawings.

Data Storage System

FIG. 1 is a block diagram of a multiple node data storage system 100, according to some embodiments of the present invention. Multiple node data storage system 100 includes multiple nodes 110, multiple storage devices 130, and a reservation system 140. Multiple host devices 120 are connected to multiple node data storage system 100 and, in particular, to nodes 110 of multiple node data storage system 100.

Multiple node data storage system 100 stores data/information that is generated by, manipulated by, processed by, or otherwise operated upon by host devices 120. Multiple node data storage system 100 is a scalable data storage system that is well suited for storing large amounts of data/information (e.g., 1 terabyte or more of data). Although multiple node data storage system 100 is shown having four nodes, multiple node data storage system 100 can include any number of nodes. In some embodiments, multiple node data storage system 100 includes 8 nodes.

Each host device 120 is capable of using a shared volume (which may also be referred to as a virtual volume), which is a portion of memory that stores data/information that is common to the host devices 120 (e.g., a database). The shared volume is implemented on one or more of storage devices 130.

Host devices 120 can include any type of processing devices, such as server computers, clusters of server computers, personal computers, or mainframe computers. Host devices 120 can also include other types of electronic devices, such as printers, modems, or routers. Although FIG. 1 shows a single host device 120 connected to each node 110, it should be recognized that multiple host devices can be connected to each node 110.

Nodes 110 can include any type of processing devices, such as server computers, personal computers, or mainframe computers. In some embodiments, nodes 110 are specialized processing devices designed to (1) provide high speed communication paths between host devices 120 and storage devices 130 such that host devices 120 can use data/information stored on storage devices 130, and (2) provide high speed node-to-node communication paths between all of the nodes 110 in multiple node data storage system 100. As shown, each node 110 includes a reservation status table 102, which is memory that stores the current reservation status of a shared volume. Reservation status tables 102 are described in detail below. Although not shown, nodes 110 can also include microprocessors, application specific integrated circuits (ASICs), random access memory (RAM), read only memory (ROM), and/or other such computer components.

Storage devices 130 can include any suitable storage devices, such as tape drives or magnetic disk drives. In some embodiments, storage devices 130 are JBODs (Just a Bunch of Disks), which are storage components that include multiple disk drives. Although FIG. 1 shows a single storage device 130 connected to each node 110, it should be recognized that multiple storage devices can be connected to each node.

Reservation system 140 generally functions to maintain, order, and manage reservations for access to the shared volume. The lines that connect reservation system 140 to nodes 110 indicate that reservation system 140 can communicate with nodes 110. Reservation system 140 can be implemented in any suitable hardware and/or software, for example, with one or more computer programs or applications. In various embodiments, reservation system 140 can operate on any suitable processing device in multiple node data storage system 100. In some embodiments, reservation system 140 operates on only one of the nodes 110 (e.g., a "master" node) at any given time. In other embodiments, reservation system 140 operates on multiple nodes 110 at any given time.

In the embodiment shown in FIG. 1, reservation system 140 includes two software components: an event manager 142 and a reservation manager 144. Event manager 142 is responsible for communication functions, such as receiving requests (or other messages) from hosts and sending requests (or other messages) to hosts. Event manager 142 is supported by the reservation manager 144, which processes requests (or other messages) sent by the hosts or generates requests (or other messages) to send to the hosts. The functions performed by reservation system 140 are described in more detail below.

A multiple node data storage system that includes nodes, host devices, and storage devices is described in detail in U.S. patent application Ser. No. 09/633,088, entitled "Data Storage System," now U.S. Pat. No. 6,658,478, which is herein incorporated by reference in its entirety. The reservation system and method according to embodiments of the present invention, described herein, can be used with the data storage system described in the co-pending patent application or with any other suitable multiple node data storage system.

Method for Reserving a Shared Volume

Figure 2A:
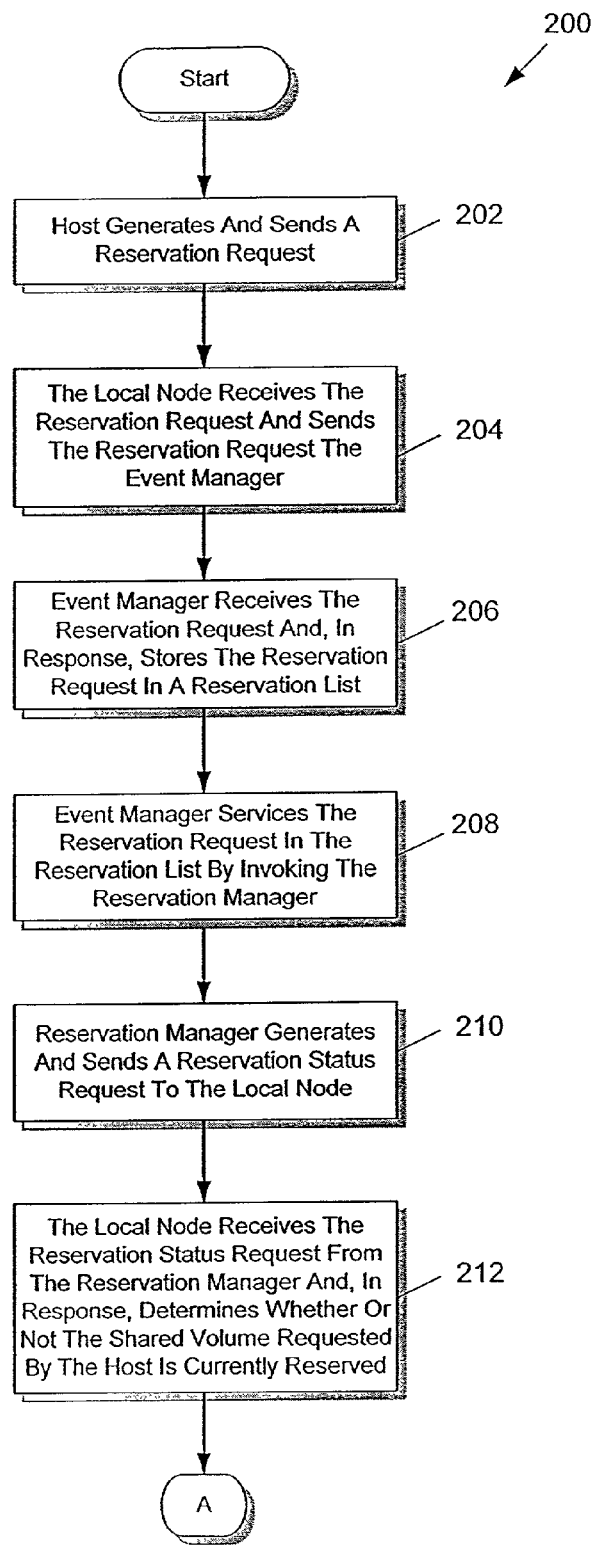
Figure 2B:
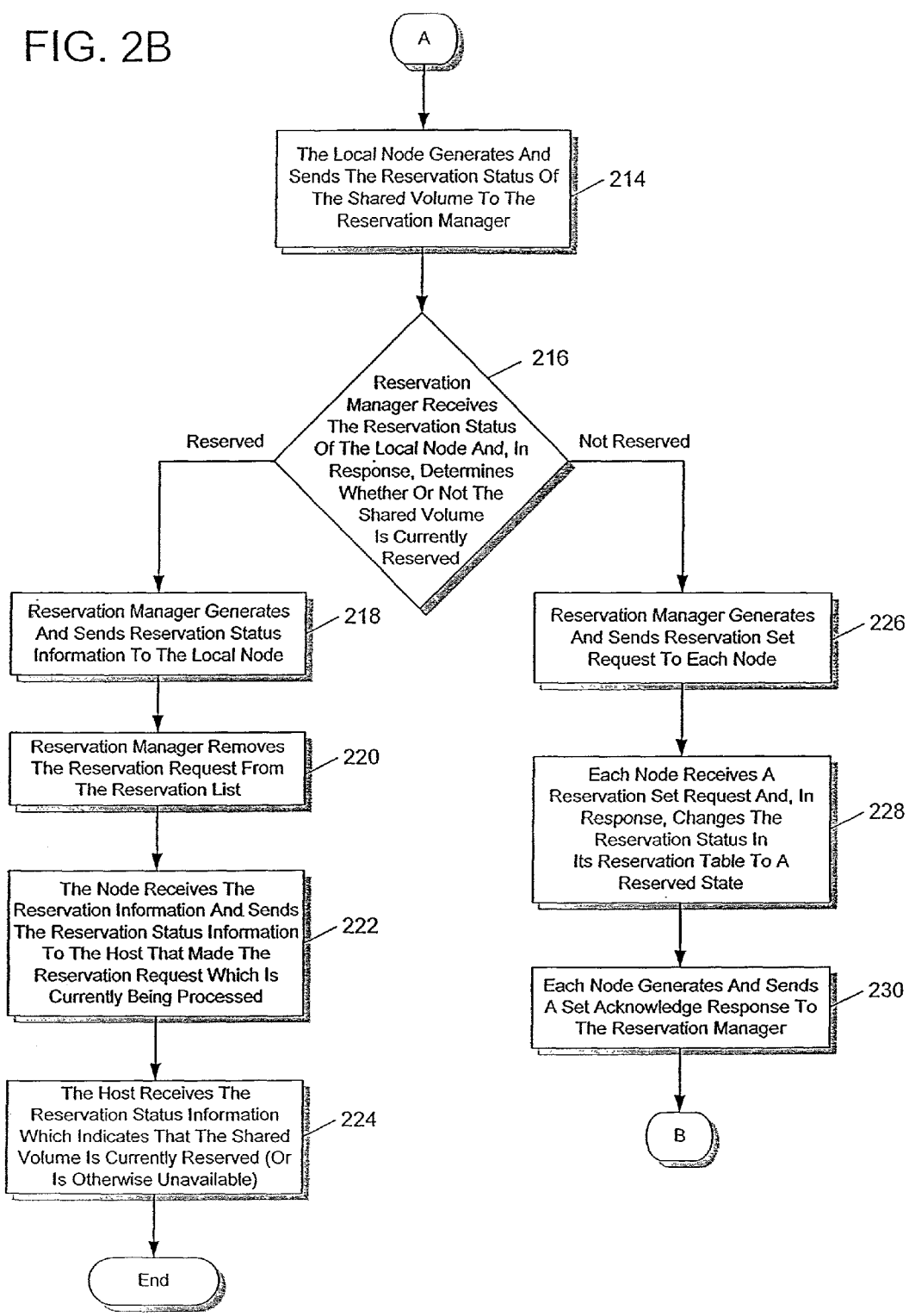

FIGS. 2A-2C are a flow chart of an exemplary method 200 for reserving a shared volume, according to some embodiments of the present invention. Method 200 is described with reference to the components shown in FIG. 1. Method 200 ensures that only one host can use a shared volume in a multiple node data storage system at any given time. In other words, method 200 ensures that when one host is using the shared volume, none of the other hosts in the multiple node data storage system can use the shared volume. In one embodiment, method 200 may be performed by the reservation system 140.

In step 202, a host generates and sends a reservation request. A host generates and sends a reservation request when it needs to use the shared volume. One or more computer programs that operate on the host, such as a host command handler, will typically generate and send the reservation request to the node that is connected to the host.

In step 204, the local node (i.e., the node that is connected to the host) receives the reservation request and sends the reservation request to the event manager. One or more computer programs that operate at the node will typically receive and send the reservation request to the event manager. In one embodiment, the one or more computer programs will receive the reservation request and send the reservation request to the event manager without processing the reservation request. This is advantageous since it minimizes the use of the processing resources on the node, which can be used to perform other tasks.

In step 206, the event manager receives the reservation request and, in response, the event manager stores the reservation request in an event list. The event list stores reservation requests and information related to the reservation requests, such as the identity of the node from which the reservation request originated and the identity of the host from which the reservation request originated.

The event manager stores reservation requests in the event list in the order that the reservation requests are received. The reservation requests are then processed one at a time with the earliest received reservation request in the event list being processed first. In other words, the reservation requests are processed in a "first-in-first-out" manner. If a new reservation request is received when a reservation request is being processed, the new reservation request is placed at the end of the event list and is processed when all of the other reservation requests in the list that arrived before it have been processed.

In step 208, the event manager services the reservation request in the event list by invoking the reservation manager.

In step 210, the reservation manager generates and sends a reservation status request to the local node (i.e., the node that is connected to the host that made the request that is currently being serviced). As explained below, the reservation status request is used to determine whether or not the shared volume requested by the host is currently reserved.

In step 212, the local node receives the reservation status request from the reservation manager and, in response, determines whether or not the shared volume requested by the host is currently reserved. The node accomplishes this by accessing a reservation status table located at the local node.

The reservation status table stores the reservation status of the shared volume, i.e., information that indicates whether or not the shared volume is currently reserved by a host. In one embodiment, each node has a reservation status table, and each reservation status table at each node contains the same reservation status information. In other words, the reservation status of the shared volume is redundantly stored in each reservation status table at each node.

By storing the reservation status of the shared volume at each node, the performance of multiple node data storage system 100 is significantly improved since a host device 120 can query for the reservation status of the shared volume by accessing the reservation status of the shared volume directly at the local node (i.e., the node that is connected to the host that makes the query). In other words, the host device 120 can determine the reservation status of the shared volume without having to access a reservation status table stored at a single central location (e.g., on only one of nodes 110 or at the reservation system 140), which would require a significant amount of processing resources to be used each time a host needed to determine the reservation status of the shared volume.

In step 214, the local node generates and sends the reservation status of the shared volume to the reservation manager.

In step 216, the reservation manager receives the reservation status of the local node and, in response, determines whether or not the shared volume is currently reserved. If the reservation status reported by the local node indicates that the shared volume is currently reserved by another host (or the shared volume is otherwise unavailable), method 200 proceeds to step 218.

In step 218, the reservation manager generates and sends reservation status information to the local node. In this case, the reservation status information indicates that the shared volume is currently reserved (or is otherwise unavailable).

In step 220, the reservation manager removes the reservation request from the event list thereby concluding the servicing of the event.

In step 222, the local node (i.e., the node that is connected to the host) receives the reservation status information and sends the reservation status information to the host. One or more computer programs that operate at the node will typically receive and send the reservation request to the host. The one or more computer programs will typically receive the reservation information and send the reservation information to the host without processing the reservation information. This is advantageous since it minimizes the use of the processing resources on the node, which can be used to perform other tasks.

In step 224, the host receives the reservation information, which indicates that the shared volume is currently reserved (or is otherwise unavailable). As a result, the host knows that it cannot use the shared volume at that time. If the host still needs to use the shared volume, the host can generate and send a new reservation request (i.e., method 200 will return to step 202).

Referring back to step 216, if the reservation status reported by the local node indicates that the shared volume is not currently reserved by another host, method 200 proceeds to step 226.

In step 226, the reservation manager generates and sends a reservation set request to each of the nodes in the multiple node data storage system. As explained below, the reservation set requests are used to set the reservation status of each node to a reserved state and thus reserve the shared volume for the host that has made the reservation request that is currently being serviced.

In step 228, each node in the multiple node data storage system receives a reservation set request from the reservation manager and, in response, each node changes the reservation status in its reservation status table to a reserved state.

In step 230, each node in the multiple node data storage system generates and sends a set acknowledge response to the reservation manager. The set acknowledge response indicates to the reservation manager that a node successfully received the set request and successfully changed the reservation status in its reservation table to a reserved state.

In step 232, the reservation manager receives the set acknowledge responses from each of the nodes and, in response, the reservation manager generates and sends reservation status information to the local node (i.e., the node that is connected to the host that made the reservation request which is currently being serviced). In this case, the reservation status information indicates that the shared volume has been reserved for the host.

In step 234, the reservation manager concludes its service and transfers control back to the event manager.

In step 236, the event manager removes the reservation request from the event list.

In step 238, the local node receives the reservation status information and sends the reservation status information to the host. One or more computer programs that operate on the node will typically receive and send the reservation request to the host. The one or more computer programs will typically receive the reservation status information and send the reservation status information to the host without processing the reservation information. This is advantageous since it minimizes the use of the processing resources on the node, which can be used to perform other tasks.

In step 240, the host receives the reservation status information, which indicates that the shared volume has been reserved for the host. As a result, the host knows that it can now use the shared volume.

In step 242, the host uses the shared volume until the host decides to release the shared volume. The host can use the shared volume to, for example, update data in the shared volume (e.g., if the shared volume is a database) or store new data in the shared volume.

In step 244, the host generates and sends a release request to the local node. The host will generate and send a release request when the host has finished using the shared volume. One or more computer programs that operate on the host, such as a host command handler, will typically generate and send the release request to the local node (i.e., the node that is connected to the host).

In step 246, the local node receives the release request and sends the release request to the event manager. One or more computer programs that operate on the node will typically receive and send the release request to the event manager. The one or more computer programs will typically receive the release request and send the release request to the event manager without processing the release request. This is advantageous since it minimizes the use of the processing resources on the node, which can be used to perform other tasks.

In step 248, the event manager receives the release request and, in response, stores the release request in the event list as in step 206. As explained below, the reservation release requests cause the nodes to change the reservation status of the shared volume to an unreserved state and thus allow another host to use the shared volume.

In step 250, the event manager services the release request by invoking the reservation manager.

In step 252, the reservation manager generates and sends a reservation release request to each node in the multiple node data storage system.

In step 254, each node in the multiple node data storage system receives a reservation release request from the reservation manager and, in response, changes the reservation status in the reservation status table to an unreserved state.

In step 256, each node in the multiple node data storage system generates and sends a release acknowledge response to the reservation manager. The release acknowledge response indicates to the reservation manager that a node successfully received the reservation release request and successfully changed the reservation status in its reservation table to an unreserved state.

In step 258, the reservation manager receives the release acknowledge responses from each of the nodes, concludes the service of the release request, and transfers control back to the event manager. If the event list contains another reservation request, the reservation manager will then process that reservation request beginning at step 208.

In step 260, the event manager removes the release request from the event list thereby concluding the servicing of the event.

Thus method 200 describes a method for reserving a shared volume in a multiple node data storage system. The method ensures that only one host will be able to use the shared volume at a time. As a result, the integrity data/information stored in the shared volume will not be corrupted due to two or more hosts using the shared volume at the same time.

Alternative Embodiments

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating any type of processing device, such as a computer. Software embodying the present invention may comprise computer instructions in any form (e.g., source code, object code, interpreted code, etc.) stored in any computer-readable medium (e.g., ROM, RAM, magnetic media, compact disc (CD) in any form, DVD, etc.). Such software may also be in the form of a computer-readable data signal embodied in a carrier wave propagating on a conductive medium.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

What is claimed is:

1. A method for reserving a shared volume in a data storage system, comprising:
   nodes of the data storage system each storing a reservation status of the shared volume, the shared volume being accessible by hosts via the nodes, the reservation status being unreserved when the shared volume is available for host access, the reservation status being reserved when the shared volume is unavailable for host access;
   a node in the data storage system receiving a request from a host to use the shared volume;
   in response to receiving the request, the node sending the request to a reservation system of the data storage system, the reservation system being located on one of the nodes of the data storage system; and
   in response to receiving the request, the reservation system reserving the shared volume for the host when the reservation status indicates that the shared volume is unreserved, wherein said reserving comprises the reservation system sending a reservation set request to the nodes to change the reservation status on the nodes.

2. The method of claim 1, wherein the node that originates the request is connected to the host.

3. The method of claim 2, after the reservation system receives the request, further comprising:
   the reservation system storing the request in an event list, wherein requests in the event list are processed in a first in, first out manner.

4. The method of claim 3, after the reservation system stores the request in the event list, further comprising:
   the reservation system retrieving the request from the event list; and
   the reservation system sending a reservation status request to the node that originates the request.

5. The method of claim 3, after the reservation system stores the request in the event list, further comprising:
   the reservation system retrieving the request from the event list;
   the reservation system sending a reservation status request to the node that originates the request; and
   the reservation system receiving a reservation status response from the node that originates the request.

6. The method of claim 3, after the reservation system stores the request in the event list, further comprising:
   the reservation system retrieving the request from the event list;
   the reservation system sending a reservation status request to the node that originates the request;
   the reservation system receiving a reservation status response from the node that originates the request; and
   the reservation system determining the reservation status of the shared volume based on the reservation status response.

7. The method of claim 1, further comprising:
   the reservation system sending information through the node to the host indicating that the host cannot use the shared volume if the node has the reservation status set as reserved.

8. The method of claim 1, further comprising:
   the reservation system sending information through the node to the host indicating that the host can use the shared volume if the node has the reservation status set as unreserved.

9. The method of claim 1, further comprising:
   the reservation system receiving a release request from the host.

10. A non-transitory computer-readable storage medium storing a computer program executable by a processing device, the computer program comprising computer instructions for: a reservation system of a data storage system receiving a request from a host through a node of the data storage system to use a shared volume on nodes of the data storage system; in response to the request, the reservation system sending a reservation status request to the node that originates the request; the reservation system receiving a reservation status response from the node that originates the request and determining the reservation status; and in response to the reservation status response, the reservation system reserving the shared volume for the host if the reservation status is set as unreserved, wherein said reserving comprises the reservation system sending a reservation set request to the nodes to change the reservation status on the nodes to reserved.

11. The non-transitory computer readable storage medium of claim 10, wherein the node that originates the request is connected to the host.

12. The non-transitory computer readable storage medium of claim 11, after the reservation system receives the request, further comprising: the reservation system storing the request in an event list and processing all requests in the event list in a first in, first out manner.

13. The non-transitory computer readable storage medium of claim 10, wherein the computer program further comprises computer instructions for: the reservation system sending information to the host indicating that the host cannot use the volume if the reservation status is set as reserved.

14. The non-transitory computer readable storage medium of claim 10, wherein the computer program further comprises computer instructions for: the reservation system sending information to the host indicating that the host can use the shared volume if the reservation status is set as unreserved.

15. The non-transitory computer readable storage medium of claim 10, wherein the computer program further comprises computer instructions for: the reservation system receiving a release request from the host.

16. A data storage system, comprising:
   a plurality of storage devices operable to store data, wherein a shared volume is implemented on the storage devices;
   a plurality of nodes operable to provide access to the storage devices for one or more host devices, each node operable to store a reservation status for the shared volume, the reservation status being unreserved when the shared volume is available for host access, the reservation status being reserved when the shared volume is unavailable for host access; and
   a reservation system implemented on one or more of the nodes, the reservation system operable to:
      receive a request from a host through a node of the data storage system to use the shared volume;
      in response to the request, send a reservation status request to the node that originates the request;
      receive a reservation status response from the node that originates the request;
      in response to the reservation status response:
         determine the reservation status from the reservation status response; and
         reserve the shared volume for the host when the reservation status indicates that the shared volume is unreserved by sending a reservation set request to the nodes to change the reservation status on the nodes to reserved.

* * * * *